US012743616B2

(12) United States Patent
Shan et al.

(10) Patent No.: US 12,743,616 B2
(45) Date of Patent: Sep. 22, 2026

(54) SYSTEM AND METHOD FOR ASYNCHRONOUS MULTI-ASPECT WEIGHTED FEDERATED LEARNING

(71) Applicant: Beijing Wodong Tianjun Information Technology Co., Ltd., Beijing (CN)

(72) Inventors: Huasong Shan, San Jose, CA (US); Tao Zeng, Livermore, CA (US); Yanqing Chen, Sunnyvale, CA (US); Peng Dai, Mountain View, CA (US); Liefeng Bo, Mountain View, CA (US)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 1310 days.

(21) Appl. No.: 17/558,533

(22) Filed: Dec. 21, 2021

(65) Prior Publication Data

US 2023/0196092 A1 Jun. 22, 2023

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/214* (2023.01); *G06F 18/217* (2023.01);
(Continued)

(58) Field of Classification Search
CPC .......... G06N 3/08; G06N 3/047; G06N 5/022; G06F 18/217; G06F 18/23213; G06F 18/214
See application file for complete search history.

(56) References Cited

PUBLICATIONS

Xie, Cong, Oluwasanmi Koyejo, and Indranil Gupta. "Asynchronous federated optimization." OPT2020: 12th Annual Workshop on Optimization for Machine Learning. arXiv preprint arXiv:1903.03934v5 (2020). (Year: 2020).*

(Continued)

*Primary Examiner* — Miranda M Huang

(74) *Attorney, Agent, or Firm* — Scully, Scott, Murphy & Presser, P.C.

(57) ABSTRACT

System and method for training a federated learning model asynchronously. The system includes a master and K number of institutional clients. The master is configured to execute an aggregation thread and K number of client management threads. The executed k-th client management thread includes: during initialization, instructing a k-th client to initiate a first iteration of training of its local federated learning model to obtain a training event $E_k$; or upon receiving an aggregation event $E_{aggr}$ from the aggregation thread, instructing the k-th client to perform a t-th iteration of training of the local federated learning model to obtain the training event $E_k$; and sending the $E_k$ to the aggregation thread. The executed aggregation thread includes: upon receiving $E_k$, updating a global federated learning model in the master to obtain the aggregation event $E_{aggr}$; and sending the $E_{aggr}$ to the k-th client management thread.

20 Claims, 7 Drawing Sheets

(51) Int. Cl.
*G06F 18/214* (2023.01)
*G06F 18/23213* (2023.01)
*G06N 3/047* (2023.01)
*G06N 5/022* (2023.01)

(52) U.S. Cl.
CPC ....... *G06F 18/23213* (2023.01); *G06N 3/047* (2023.01); *G06N 5/022* (2013.01)

(56) References Cited

PUBLICATIONS

Burlachenko, Konstantin, Samuel Horváth, and Peter Richtárik. "FI_pytorch: optimization research simulator for federated learning." Proceedings of the 2nd ACM international workshop on distributed machine learning. 2021. (Year: 2021).*

Huang, Wei, et al. "Fairness and accuracy in federated learning." arXiv preprint arXiv:2012.10069 (2020). (Year: 2020).*

Li, Daliang, and Junpu Wang. "Fedmd: Heterogenous federated learning via model distillation." arXiv preprint arXiv:1910.03581 (2019). (Year: 2019).*

Xie, Ming, et al. "Multi-center federated learning." arXiv e-prints (2021): arXiv:2005.01026v2 (Year: 2021).*

Kontar, Raed, et al. "The internet of federated things (ioft)." IEEE Access 9 (2021): 156071-156113. (Year: 2021).*

McMahan, Brendan, et al., Communication-efficient learning of deep networks from decentralized data, Proceedings of the 20th International Conference on Artificial Intelligence and Statistics (AISTATS), JMLR, 2017.

Hinton, Geoffrey, et al., Distilling the knowledge in a neural network, 2015, arXiv:1503.02531.

Glorot, Xavier, and Bengio, Yoshua, Understanding the difficulty of training deep feedforward neural networks, Proceedings of the Thirteenth International Conference on Artificial Intelligence and Statistics (AISTATS), JMLR, 2010.

Chen, Yang, et al., Communication-efficient federated deep learning with layerwise asynchronous model update and temporally weighted aggregation, IEEE Transactions on Neural Networks and Learning Systems, 2019, 31(10):4229-4238.

Xie, Cong, et al., Asynchronous federated optimization, 2019, arXiv:1903.03934.

Jin, Hongwei, et al., Simulating aggregation algorithms for empirical verification of resilient and adaptive federated learning, 2020 IEEE/ACM International Conference on Big Data Computing, Applications and Technologies (BDCAT), 2020, 124-133.

* cited by examiner

Master 210

Processor 212

Memory 214

Storage Device 216

Asynchronous Federated Learning Application 218

Aggregation Thread Module 220

Client-1 Management Thread Module 222

. . .

Client-k Management Thread Module 224

. . .

Client-K Management Thread Module 226

Global Federated Learning Model 228

Network 230

Client-1

Student Model-1

Teacher Model-1

Dataset-1

Client-2

Student Model-2

Teacher Model-2

Dataset-2

. . .

Client-k

Student Model-k

Teacher Model-k

Dataset-k

. . .

Client-K

Student Model-K

Teacher Model-K

Dataset-K

Clients 250

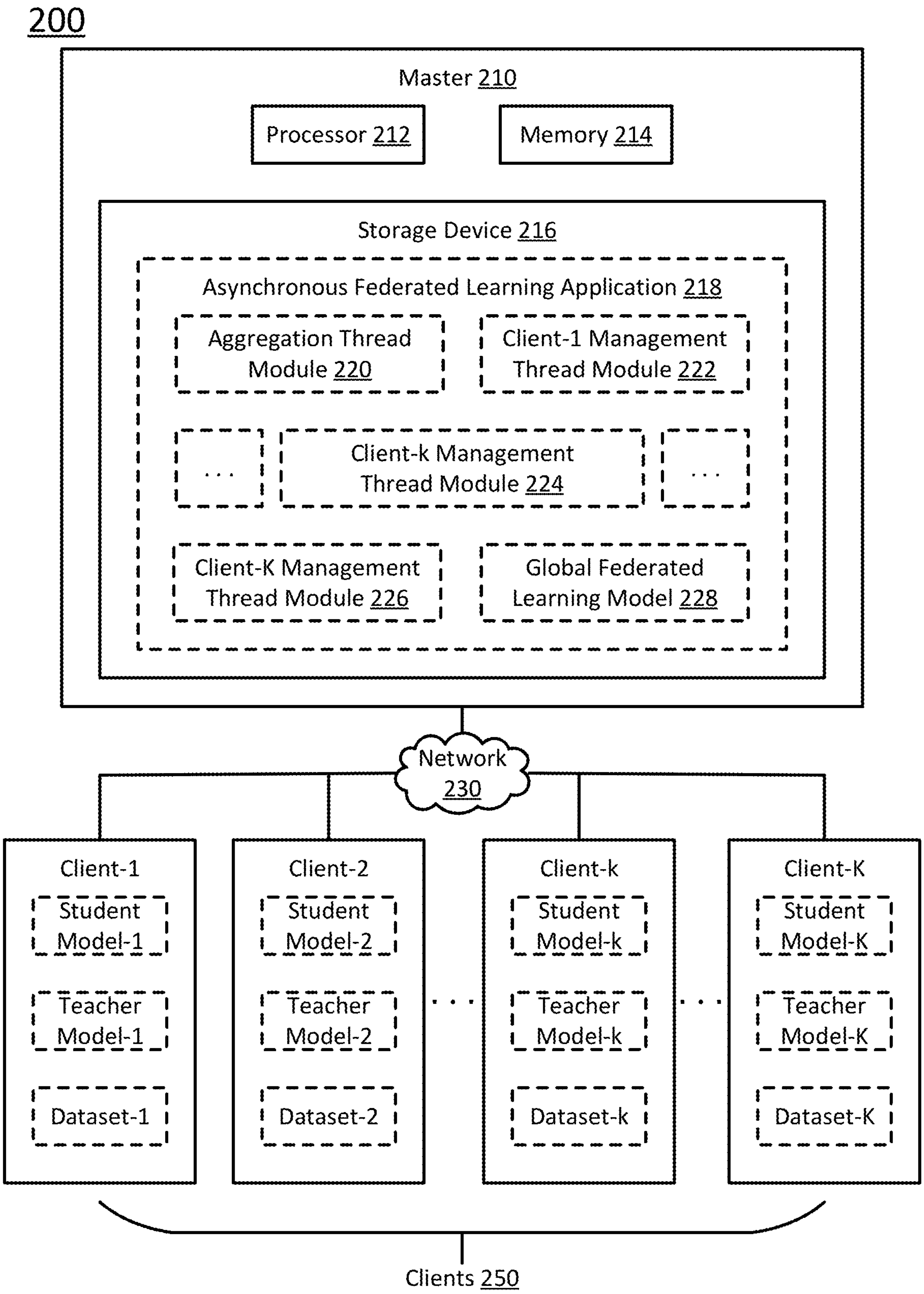

FIG. 2

Algorithm 1

Server executes:
  Define aggregation event E_aggr and run a aggr_thread()
  for each client k:
    Define training event $E_k$ and run a client_mgr_thread$_k$() for client k Thread aggr_thread():
    /*server immediately updates global model whenever it receives a local model*/
    /*$E_k$ includes client number $k \in K$, global epoch number $t \in T$, client report timestamp ts, dataset size $n^k$, accuracy $p_{t,k}$, parameters of local model $W_{t,k,ts}$*/
    Receive the notification via $E_k$
    /*Calculate staleness weight value $\alpha_t$ using t, ts */
    $\alpha_t = f(t, ts, \alpha)$
    **/*update global model */**
    $W_t = (1-\alpha_t) * W_{t-1} + \alpha_t * * p_{t,k} * W_{t,k,ts}$
    Send notification E_aggr to client k management thread for next training iteration Thread client_mgr_thread$_k$():
    if is_first_training _iteration():
      ClientUpdate(k, t, None) /*client k is notified of first training iteration*/
    else:
      /*update local models at any time without synchronization*/
      Receive the notification via E_aggr
      ClientUpdate(k, t, $W_t$) /*client k is notified of next training iteration using $W_t$*/
    Send notification $E_k$ to aggregation thread for updating global model

FIG. 4

Algorithm 2

Client executes: /*run on client k*/
ClientUpdate(k, t, $W_t$)
 if $W_t$ == None: /*is_first_training _iteration*/
  initialize $W_{t,k,0}$ **/*randomly or by knowledge distillation*/**
 else:
  /*client k received global model $W_t$*/
  Initialize $W_{t,k,0} = W_t$
 /*train local model using SGD*/
 for each local epoch i ∈ E:
 for each batch b ∈ B:
 $W_{t+1,k,ts} = W_{t,k,ts} - \; * \nabla L(w,b)$
Return (t+1, ts, $n^k$, $p_{t+1,k}$, $W_{t+1,k,ts}$) to sever /* client_mgr_thread$_k$ */

FIG. 5

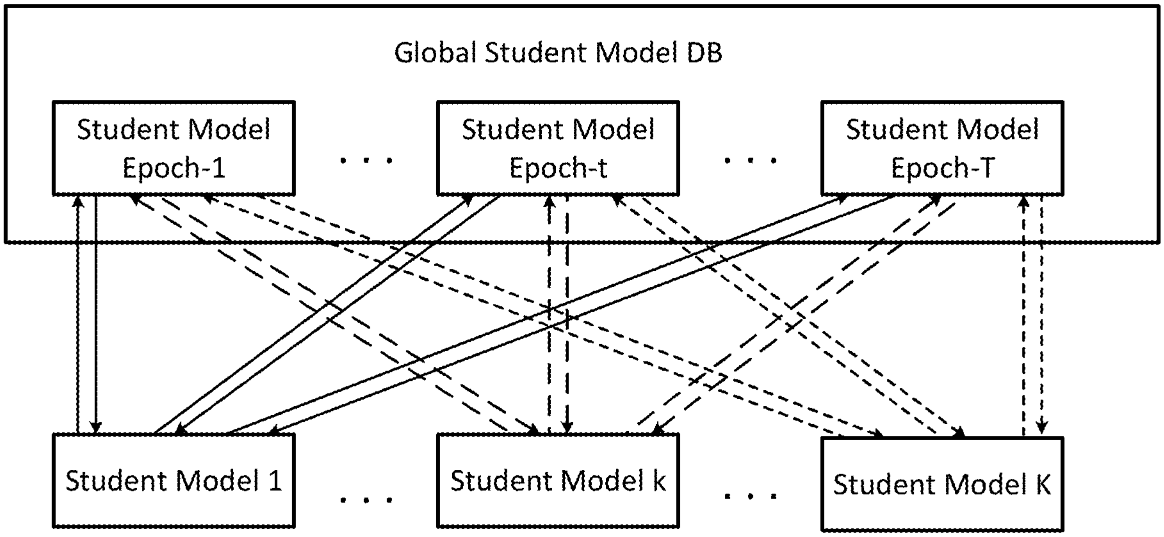

FIG. 6

SYSTEM AND METHOD FOR ASYNCHRONOUS MULTI-ASPECT WEIGHTED FEDERATED LEARNING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD OF THE DISCLOSURE

The present disclosure relates generally to federated learning, and more specifically related to systems and methods of asynchronous multi-aspect weighted federated learning for accelerating multi-institutional collaboratively modelling.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Data privacy has become a big concern in recent years. The General Data Protection Regulation (GDPR) has been put into effect in the European Union (EU) in 2018 to protect privacy and security of people in the EU, and the California Consumer Privacy Act of 2018 (CCPA) provides consumers control over their personal information against businesses. Despite tougher privacy protection laws, there is still a need for different institutions to collaboratively build some common models using their own institutional data.

Federated learning is a well-known solution to the challenging problem, which can allow multiple participants to collaboratively train a common machine learning/deep learning model without sharing their data by homomorphic encryption, multi-party computation etc., while guaranteeing data privacy and data security. Federated Learning includes two stages: 1) each client (the training participation) trains a local model using their own datasets without sharing them to others, and then sends parameters of local model to a master; and 2) the master (the training coordinator) aggregates a global model after it receives all/part of local models with various aggregating algorithms. When the aggregation is performed in a synchronous manner, there is idle time and waiting for synchronization wastes computing resources. When the aggregation is performed in an asynchronous manner, it is hard for the aggregation to converge.

Therefore, an unaddressed need exists in the art to address the aforementioned deficiencies and inadequacies.

SUMMARY OF THE DISCLOSURE

In certain aspects, the present disclosure relates to an asynchronous multi-aspect weighted federated learning algorithm which can squeeze the idle time, solve the long synchronous waiting problem and the hard convergence problem for multi-institutional collaboratively modelling. In certain embodiments, an asynchronous algorithm solves the long synchronous waiting problem, and achieves totally asynchronous aggregation in institutional federated learning setting, which is different from partially asynchronization in device asynchronous aggregation. In certain embodiments, the disclosure designs two types of events (aggregation event, local-model train management events) on the server side, defines a thread pool, each thread in the thread pool manages the training of an institution, which is totally asynchronous, unlike the partial asynchronization using a periodical trigger method. Thus, the algorithm can squeeze all the idle time in each institution, achieving totally asynchronous aggregation and accelerating the training of global model. Further, the multi-aspect weighted aggregation method of the disclosure can improve the hard convergence problem in multi-institutional collaboratively modelling setting by considering the impact of all factors, including skewed dataset size of each client, staleness of local models, and fluctuated accuracy of local models. The multi-aspect feature of the disclosure guarantees the convergence of the global model, and further speeds up the training of the global model.

In certain aspects, the present disclosure relates to a system for federated learning. In certain embodiments, the system includes a master computing device, the master computing device has a processor and a storage device storing computer executable code. The computer executable code, when executed at the processor, is configured to:

execute a k-th client management thread of K client management threads by: during initialization, instructing a k-th client computing device to initiate a first iteration of training of a k-th client federated learning model to obtain a training event $E_k$; upon receiving an aggregation event $E_{aggr}$ from an aggregation thread, instructing the k-th client computing device to perform a t-th iteration of training of the k-th client federated learning model using the aggregation event $E_{aggr}$ to obtain the training event $E_k$; and sending the training event $E_k$ to the aggregation thread; and execute the aggregation thread by: upon receiving the training event $E_k$ from the k-th client management thread, updating a global federated learning model in the master computing device to obtain the aggregation event $E_{aggr}$; and sending the aggregation event $E_{aggr}$ to the k-th client management thread.

In certain embodiments, the training event $E_k$ includes a client number k, a global epoch number t, a client report timestamp ts, a dataset size $n^k$ for training the k-th client federated learning model, an accuracy $p_{t,k}$ for the t-th iteration of training of the k-th client federated learning model, and a local model weight of the k-th client federated learning model $W_{t,k,ts}$ after the t-th iteration of training. In certain embodiments, $k \in K$, K is a positive integer indicating a total number of client computing devices, $t \in T$, and T is a positive integer indicating a total iteration of epochs for training each client federated learning model stored in corresponding one of the K client computing devices.

In certain embodiments, the step of updating the global federated learning model to obtain the aggregation event $E_{aggr}$ is performed using a equation of:

$$W_t = (1 - \alpha_t) * W_{t-1} + \alpha_t * \sum_{k=1}^{K} \left( \frac{n^k}{n} * p_{t,k} * W_{t,k,ts} \right),$$

where $W_t$ is updated weight of the global federated learning model after incorporating parameters from the received training event $E_k$, $W_{t-1}$ is weight of the global federated learning model before incorporating the parameters of the received training event $E_k$, n is summated training dataset size from all the K clients, $\alpha_t$ is staleness discount rate of the t-th iteration of training of the k-th client federated learning model, and $p_{t,k}$ is accuracy of the t-th iteration of training of the k-th client federated learning model.

In certain embodiments, the staleness discount rate $\alpha_t$ is a function of t, ts, and $\alpha$, t indicates an earliest time that one of the K federated learning model finishes the t-th iteration of training, and $\alpha$ is a hyperparameter of the k-th client federated learning model after the t iteration of training indicating a staleness weight value. In certain embodiments, the staleness discount rate $\alpha_t$ is calculated using at least one of a linear function, a polynomial function, and an exponential function.

In certain embodiments, each of the K client federated learning models is initialized by knowledge distillation. In certain embodiments, each of the K client federated learning model is initialized randomly.

In certain embodiments, each of the K number of client federated learning models is trained using stochastic gradient descent (SGD).

In certain embodiments, the federated learning is an institutional federated learning. In certain embodiments, K is a positive number in a range of 2-100. In certain embodiments, K is in the range of 2-10.

In certain embodiments, the global federated learning model comprises T number of global federated learning model versions, and the k-th client federated learning model is configured to, after each iteration of trainings, update corresponding one of the T number of global federated learning model versions.

In certain aspects, the present disclosure relates to a method for federated learning. In certain embodiments, the method includes:

executing, by a master computing device, K client management threads, where a k-th client management thread of the K client management threads is performed by: during initialization, instructing a k-th client computing device to initiate a first iteration of training of a k-th client federated learning model to obtain a training event $E_k$; upon receiving an aggregation event $E_{aggr}$ from an aggregation thread, instructing the k-th client computing device to perform a t-th iteration of training of the k-th client federated learning model using the aggregation event $E_{aggr}$ to obtain the training event $E_k$; and sending the training event $E_k$ to the aggregation thread; and executing, by the master computing device, the aggregation thread, wherein the aggregation thread is performed by: upon receiving the training event $E_k$ from the k-th client management thread, updating a global federated learning model in the master computing device to obtain the aggregation event $E_{aggr}$; and sending the aggregation event $E_{aggr}$ to the k-th client management thread.

In certain embodiments, the training event $E_k$ comprises a client number k, a global epoch number t, a client report timestamp ts, a dataset size $n^k$ for training the k-th client federated learning model, an accuracy $p_{t,k}$ for the t-th iteration of training of the k-th client federated learning model, and a local model weight of the k-th client federated learning model $W_{t,k,ts}$ after the t-th iteration of training. In certain embodiments, k∈K, K is a positive integer indicating a total number of client computing devices, t∈T, and T is a positive integer indicating a total iteration of epochs for training each client federated learning model stored in corresponding one of the K client computing devices.

In certain embodiments, the step of updating the global federated learning model to obtain the aggregation event $E_{aggr}$ is performed using a equation of:

$$W_t = (1-\alpha_t) * W_{t-1} + \alpha_t * \sum_{k=1}^{K}\left(\frac{n^k}{n} * p_{t,k} * W_{t,k,ts}\right),$$

where $W_t$ is updated weight of the global federated learning model after incorporating parameters from the received training event $E_k$, $W_{t-1}$ is weight of the global federated learning model before incorporating the parameters of the received training event $E_k$, n is summated training dataset size from all the K clients, $\alpha_t$ is staleness discount rate of the t-th iteration of training of the k-th client federated learning model, and $p_{t,k}$ is accuracy of the t-th iteration of training of the k-th client federated learning model.

In certain embodiments, the staleness discount rate $\alpha_t$ is a function of t, ts, and $\alpha$, t indicates an earliest time that one of the K federated learning model finishes the t-th iteration of training, $\alpha$ is a hyperparameter indicating a staleness weight value, wherein the staleness discount rate $\alpha_t$ is calculated using at least one of a linear function, a polynomial function, and an exponential function.

In certain embodiments, each of the K client federated learning models is initialized by knowledge distillation.

In certain embodiments, the federated learning is an institutional federated learning.

In certain aspects, the present disclosure relates to a non-transitory computer readable medium storing computer executable code. The computer executable code, when executed at a processor of a computing device, is configured to perform the method described above.

In certain embodiments, the present disclosure is used under a situation where an ecommerce company and a shipping carrier collaboratively build a high-performance NLP-based model to represent/extract logistics information, while the two institutions can not violate the data protection law and share their customers' data to each other.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 2 schematically depicts a system of asynchronous federated learning according to certain embodiments of the disclosure.

FIG. 4 schematically depicts an algorithm that operates in a master of a federated learning system according to certain embodiments of the present disclosure.

FIG. 5 schematically depicts an algorithm that operates in a client of a federated learning system according to certain embodiments of the present disclosure.

FIG. 6 schematically depicts update sequence of the models according to certain embodiments of the present disclosure.

DETAILED DESCRIPTION

Figure 1A:
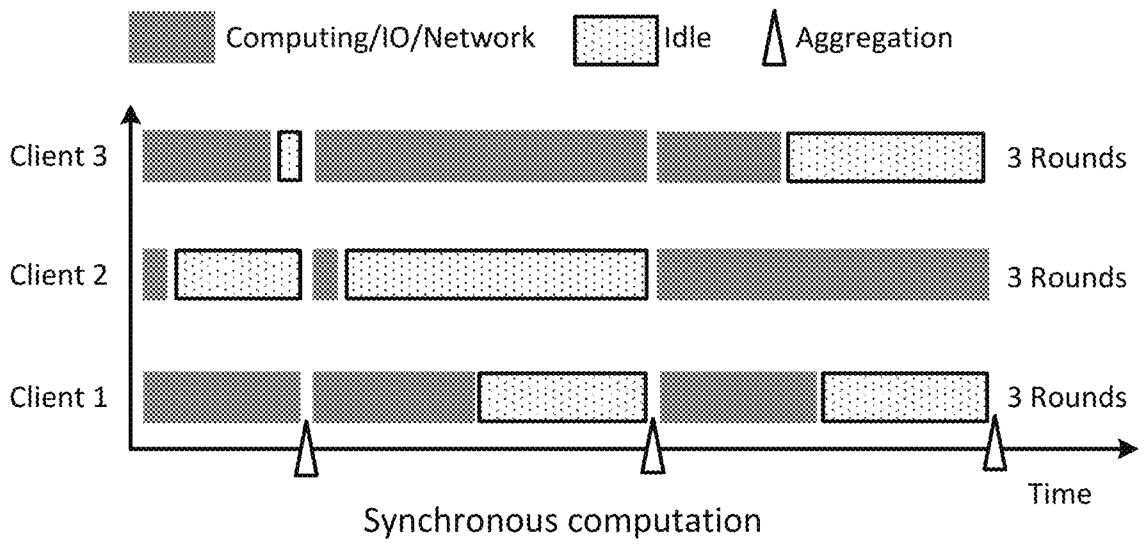
FIG. 1A schematically depicts synchronous computation according to certain embodiments of the disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Some notations and terminologies used in certain embodiments of the disclosure is as follows: K, the number of clients; B, the number of local minibatch (hyperparameter); E, the number of local epochs (hyperparameter); T, the number of global epochs (hyperparameter); a, a staleness weight value (hyperparameter); W, parameter of model; $\eta$, the learning rate (hyperparameter); L, loss function; and $f(t, ts)$, the staleness function.

In certain embodiments, model aggregation algorithms in federated learning setting are based on synchronous mechanism (e.g., FedSGD, FedAvg, FedMA, etc.), which means the collaborator has to wait for the end of training of major portion of participations in each aggregation round. FIG. 1A schematically depicts synchronous computation according to certain embodiments of the present disclosure. As shown in FIG. 1A, when synchronous computation is performed, coordination of the clients 1-3 is required at certain time intervals. At each time interval in the clients 1-3, the computation may include both computing time and idle time such that the clients 1-3 can start the next round of training at the same time. In device federated learning setting, 1) the number of training participations (devices) are big, if some of participations are dropped/ignored due to unstable environments, synchronous aggregation algorithms can still work; and 2) the dataset is small in each of the devices, so the gap of end time of training local models in a global epoch among devices is small, less gap means less idle time. However, the gap is much large in multi-institutional collaboratively modelling and the synchronization is even hard because, 1) the number of training participations is small, and the data from each client are very important, the local model of each client cannot be ignored during an aggregation epoch, otherwise, it is meaningless to collaboratively build a model; and 2) although the training environment is stable in multi-institutional setting, the synchronization is even hard for different institutions due to their unbalanced dataset size and heterogenous environment. In addition, big models (e.g., BERT) are used among institutions, and big model leads to big gap of end time of training local models.

Figure 1B:
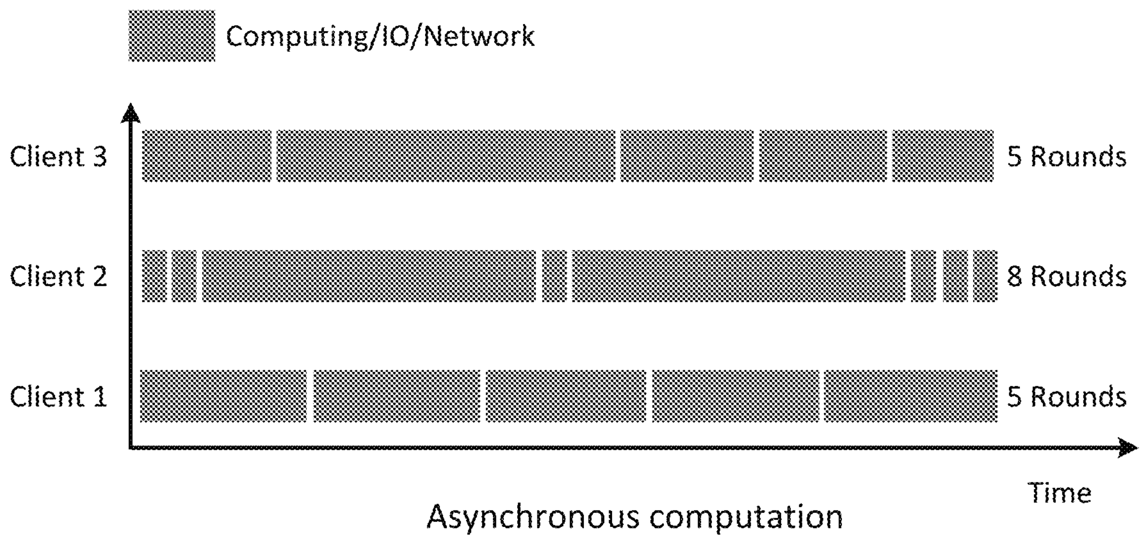
FIG. 1B schematically depicts asynchronous computation according to certain embodiments of the disclosure.

In the embodiments shown above, synchronous mechanism results in much longer idle time/synchronization waiting and wastes computing resources. In contrast, asynchronous aggregation can reduce idle time and finish more rounds (5/8/5 rounds) than synchronous aggregation (all 3 rounds) during the same time period, accelerating the training process. FIG. 1B schematically depicts asynchronous computation according to certain embodiments of the present disclosure. As shown in FIG. 1B, no coordination is required among the clients 1-3, and the computation in the workers 1-3 is continuous. When one of the workers 1-3 finishes one round of training, it will start the next round without idle time. Accordingly, the asynchronous computation is much more efficient because it keeps all computational resources busy all the time. Although asynchronous aggregation is more efficient, it is harder for the asynchronous aggregation to converge in the same training rounds than synchronous aggregation. Please note that computing/IO/network periods for each client shown in FIG. 1A and FIG. 1B is shifty in each round, because running environments of each client might be changed (e.g., network transmission is unstable under public network), and dataset size might be changed, etc.

To further improve federated learning shown in FIG. 1A and FIG. 1B, systems and methods for asynchronous multi-aspect weighted federated learning are provided in the present disclosure, which achieve true asynchronization. FIG. 2 schematically depicts a system for federated learning according to certain embodiments of the present disclosure. As shown in FIG. 2, the system 200 includes a master 210, a network 230, and K clients 250. The master 210 and the K clients 250 are in communication with each other through the network 230. In certain embodiments, each of the master 210 and the clients 250 shown in FIG. 2 may be a server computer, a cluster, a cloud computer, a general-purpose computer, a headless computer, or a specialized computer, which provides federated learning capacity. In certain embodiments, each of the master 210 and the clients 250 is the server computing device. In certain embodiments, the master 210 is also named a coordinator, a server, or a master computing device 210; and each client 250 is also named a worker, or a client computing device. In certain embodiments, the master 210 includes a global federated learning model, and each of the clients 250 includes a local federated learning model and its respective private data. The master 210 and the clients 250 may work together to train the federated learning models, but the private data are protected in the corresponding clients and not shared with other clients 250 or the master 210, and each client 250 has its own model weight. In certain embodiments, the federated learning model is an asynchronous federated learning model, and the private data are horizontally partitioned data. The network 230 may be a wired or wireless network, and may be of various forms, such as a public network and a private network. Examples of the network 230 may include, but not limited to, a local area network (LAN) or wide area network (WAN) including the Internet. In certain embodiments, two or more different networks 230 may be applied to connect the master 210 and the clients 250.

As shown in FIG. 2, the master 210 may include, without being limited to, a processor 212, a memory 214, and a storage device 216. In certain embodiments, the master 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The processor 212 may be a central processing unit (CPU) which is configured to control operation of the master 210. The processor 212 can execute an operating system (OS) or other applications of the master 210. In certain embodiments, the master 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the master 210. In certain embodiments, the memory 214 may be a volatile memory array. In certain embodiments, the master 210 may run on more than one memory 214. In certain embodiments, the master 210 may further include graphic card to assist the processor 212 and the memory 214 with image processing and display. The storage device 216 is a non-volatile data storage media for storing the OS (not shown) and other applications of the master 210. Examples of the storage device 216 may include non-volatile memory such as flash memory, memory cards, USB drives, hard drives, floppy disks, optical drives, solid-state drive, or any other types of data storage devices. In certain embodiments, the master 210 may have multiple storage devices 216, which may be identical storage devices or different types of storage devices, and the applications of the master 210 may be stored in one or more of the storage devices 216 of the master 210. In this embodiments, the processor 212, the memory 214, and the storage device 216 are component of the master 210, such as a server computing device. In other embodiments, the master 210 may be a distributed computing device and the processor 212, the memory 214, and the storage device 216 are shared resources from multiple computing devices in a pre-defined area.

The storage device 216 includes, among other things, an asynchronous federated learning application 218. The asynchronous federated learning application 218, when being executed, is configured to coordinate training of the global federated learning model in the master 210 and training of the local federated learning model in each of the K clients 250. The asynchronous federated learning application 218 includes an aggregation thread module 220, K client management thread modules 222-228, and the global federated learning model 228.

In certain embodiments, the asynchronous federated learning application 218 may include other applications or modules necessary for the operation of the asynchronous federated application 218, such as a listener configured to receive a notice or an instruction from threads and the clients 250, or a preparation module that defines events and threads. The defined threads include an aggregation thread defined by the aggregation thread module 220 and K client management threads defined by K client management thread modules 222-226. The K client management threads includes the first client management thread or the client-1 management thread, the second client manage thread or client-2 management thread), . . . , the k-th client management thread or the client-k management thread, . . . , and the K-th client management thread or the client-K management thread. The aggregation thread is configured to update the global federated learning model 228, and each of the K client management threads is configured to instruct corresponding one of the clients 250 to update its local federated learning model. The defined events include a training event from any of the clients 250 and an aggregation event from the master 210. For the training event $E_k$ corresponding to one round of the training of the local federated learning model in the client-k, the training event $E_k$ may include a client number k, a global epoch number t (iteration number or round number), a client report timestamp ts, a data size $n^k$, and parameters of the local federated learning model $W_{t,k,ts}$ after the round of training. $k \in K$, and K is a positive integer indicating the total number of clients 250. $t \in T$, and T is a positive integer indicating a total number of global epochs for training each of the client federated learning models. The client report timestamp ts may report the time at the end of the round of training of the local federated learning model in the client-k that generates the training event $E_k$, and the time ts is relative to the time of the t epoch or the beginning of the training in the epoch t. The data size $n^k$ is the size of the dataset-k. The aggregation event $E_{aggr}$ corresponds to one update of the global federated learning model in the master 210 after receiving one training event $E_k$ from one of the clients 250, the event $E_{aggr}$ may include the client number k, the global epoch number t, and parameters of the global federated learning model $W_t$. The parameters $W_t$ is updated using the event $E_k$, and the event $E_{aggr}$ containing the updated parameters $W_t$ will then be sent back to the client-k. There are T number of $E_k$ for each of the K clients, thus there will be T×K number of $E_k$ during the training of the global and local models. Accordingly, the global model weight $W_t$ will be updated T×K times.

It should be noted that the modules 220-228 are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained by aggregating weights of the local federated learning models from the clients 250, and can send the updated weight of the global federated learning model 228 to the clients 250. In certain embodiments, the function of the asynchronous federated learning application 218 corresponds to Algorithm 1 shown in FIG. 4.

As shown in FIG. 2, the aggregation tread module 220 is configured to, when being executed, provide an aggregation thread. The K client management thread modules 222-228 are configured to, when being executed, provide K client management threads. Each of the K client management threads corresponds to corresponding one of the K client 250. The following description will use the client-k as an example, which could be anyone of the K clients from client-1 to client-K.

The aggregation thread is configured to receive a training event $E_k$ from the client-k management thread, use the training event $E_k$ to update the global federated learning model 228 so as to obtain the aggregation event $E_{aggr}$ containing the updated global weight, and send the aggregation event $E_{aggr}$ back to the client-k management thread, such that the client-k management thread can call the client-k to perform the next iteration of training using the updated global model weight. Kindly note that the training event $E_k$ may correspond to any iteration of training of the local federated learning model in the client-k, and the corresponding aggregation event $E_{aggr}$ will be sent to the client-k via the client-k management thread, so that the client-k can start the next iteration of training of the local federated learning model. When a predefined iterations of training has been completed for the client-k, the aggregation thread will update the weight of the global federated learning model 228 as the final model weight, and the final model weight will be sent to all the clients 250 as the final weight of all the local models.

The aggregation thread is configured to update the global federated learning model 228 by calculating a staleness weight value and using the staleness value to calculate the weight of the global federated learning model. The calculation of the staleness weight value is performed using the equation:

$$\alpha_t = f(t, ts, \alpha) \quad (1)$$

In certain embodiments, the disclosure uses various mathematical function to define the monotonically decrease function $f(t, ts, \alpha)$, e.g., linear function, polynomial function, exponential function, etc. For example:

$$\text{Linear function: } f = \frac{1}{1 + \alpha(ts - t)}, \quad (2)$$

$$\text{Polynomial function: } f = (1 + ts - t)^{-\alpha}, \text{ and} \quad (3)$$

$$\text{Exponential function: } f = e^{-\alpha(ts - t)}, \quad (4)$$

Here tin the equations (1)-(4) is not the global epoch number, but the finishing time of the t-th global epoch of the client that finishes the t-th global epoch the earliest, ts is the timestamp at which each local client finishes its t-th global epoch, and a is the staleness weight value (hyperparameter), $\alpha \in (0,1)$, and e is natural logarithm. In certain embodiments, the exponential function (4) is used, which is better than the linear function (2) and the polynomial function (3). In certain embodiments, the ts-t in the equations (2)-(4) is defined as follow: (1) for the t-th epoch of training, the K clients have different finishing times, and the client finishes the t-th epoch of training the earliest finishes at a timestamp A, (2) all the other clients finish their t-th epoch of training at a time later than the timestamp A, and the client k finishes its t-th epoch of training at the timestamp ts, (3) the ts-t may be a time period from the timestamp A to the timestamp ts, which could be a value with a unit in seconds or milliseconds, (4) in certain embodiments, rather than the value of the time period, the ts-t may also be a normalized value in a range of 0-1, where the greater the time difference between the timestamp A and the timestamp ts, the closer the value to 1.

In institutional federated learning environments, the staleness of local models is even serious due to heterogenous environments, skewed dataset size, and bigger model. The aggregation method according to certain embodiments of the present disclosure uses staleness discount rate $\alpha_t$ as a critical aspect to quantify the impact of staleness and help the convergence of the global model.

After obtaining the staleness weight value $\alpha_t$, the aggregation thread is further configured to update the weight of the global federated learning model 228 by:

$$W_t = (1-\alpha_t) * W_{t-1} + \alpha_t * \sum_{k=1}^{K}\left(\frac{n^k}{n} * p_{t,k} * W_{t,k,ts}\right), \quad (5)$$

wherein $W_t$ is parameter or weight of the global federated learning model 228 after incorporating the local model parameter $W_{t,k,ts}$, $W_{t-1}$ is weight of the global federated learning model before incorporating the $W_{t,k,ts}$, n is summated dataset size from all K clients 250, $\alpha_t$ is the staleness weight value of the t-th iteration of training of the client-k federated learning model, and $p_{t,k}$ is accuracy of the t-th iteration of training of the client-k federated learning model. Kindly note that the weight $W_{t-1}$ is not one absolute value, because it will be updated every time one of the K client student model is updated. $W_{t-1}$ is actually the weight for the student model epoch-(t−1) in the master, and the weight will be updated K times during the training of the model. Similarly, the weight $W_t$ will also be updated K times.

Considering various aspects that impact the training convergence of the global federated learning model, including skewed dataset size of each client, staleness of the local models, and fluctuated accuracy of the local models, as shown in the above equation (5), the present disclosure incorporates the three aspects to improve the convergence of the global federated learning model 228 during training: dataset size, staleness discount rate, and accuracy. From the three aspects, the disclosure can mitigate the error caused by skewed dataset size of each client, staleness of local models, and fluctuated accuracy of local models when aggregating the global model.

The first aspect of the weighted aggregation method is the data size proportion. In institutional federated learning environments, institution number is smaller than device number in device federated learning environments. Thus, skewed dataset size among institutions has a big influence on the convergence of the global model. In certain embodiments, the client with larger dataset size proportion has larger contribution to the parameter of global model. Therefore, as shown in the above equation (5), during aggregation, the present disclosure is configured to use dataset size proportion $n^k/n$ as a critical aspect to quantify the contribution of each institution based on its dataset size and help the convergence of the global model. Here $n^k$ is the data size of the client-k, and n is the summated data size of all the K client.

The second aspect of the weighted aggregation method is the staleness discount rate. As described above, the present disclosure is configured to use the equation (1): $\alpha_t = f(t, ts, \alpha)$ to calculate the staleness discount rate, which defines a monotonically decrease function using both the difference ts-t and the hyperparameter a.

The third aspect of the weighted aggregation method is the accuracy of the local model. In certain embodiments, each institution such as the client-k trains a local model using train/test split and cross validation in each round to avoid overfitting, and outputs a local model and its accuracy $p_{t,k}$ in each global round t. The accuracy $p_{t,k}$ represents the performance of current local model. Integrating a poor performance local model into the global model might increase the error and degrade the performance of the global model. Accordingly, the present disclosure is configured to use the accuracy $p_{t,k}$ as another term to quantify the contribution of the local model. The addition of the accuracy aspect is useful to help the convergence of the global model. As a result, the client with better performance local model has larger contribution for improving the performance of global model.

By incorporating the three aspects in the equation (5), certain embodiments of the present disclosure improves convergence of the global federated learning model efficiently.

In addition to the one aggregation thread, the executed asynchronous federated learning application 218, specifically the executed client management thread models 222-226, provide K client management threads, and each of the K client management threads is configured to manage operation of corresponding one of the K clients. The client-k management thread is used as an example to describe the function of each of the K client management threads. In certain embodiments, the client-k management thread is configured to, when being initialized, instruct the client-k to run the first training iteration. The client-k management thread may use the function ClientUpdate to call the training of the client-k, and the parameter of the function ClientUpdate includes the client number k, the epoch t, and the current weight of the global model. Because it is the first raining iteration for the client-k, the value of the epoch would be 1, and the current weight is none. For the second training iteration, the value of the epoch would be 2, and the current global weight is $W_2$. For the t-th training iteration, the value of the epoch would be t, and the current global weight is $W_t$. The ClientUpdate (k, t, $W_t$) will run at the client-k, and send the running result to the client-k management thread, so that the client-k management thread can generate the current training event $E_k$ based on the running result. After generation, the client-k management thread is further configured to sends the current training event $E_k$ to the aggregation thread.

The global federated learning model 228 may be any type of federated learning model, which is used to aggregate the client federated learning model parameters to update the global federated learning model weight, and send the updated global weight to the corresponding client model. In certain embodiments, the global federated learning model 228 includes K number of global models, each of the number of global models corresponds one epoch of training.

The client 250 includes the K clients from client-1 to the client-K. Each of the client 250 may be a computing device having a processor, a memory, and a storage device. The description of the processor, memory and storage device of the client 250 is substantially the same as the description of the processor 212, the memory 214 and the storage device 216 of the master 210. The storage device of one client 250 includes a private dataset, a teacher model, and a student model. The details of the dataset, teacher model, and the student model is described in regard to the client k. As shown in FIG. 2, the client-k has a dataset-k, a teacher model-k, and a student model-k.

When the training of the local model in the client-k is launched in the first iteration or the first round, the local model parameter should be initialized. A too-large initialization leads to exploding gradients, and a too-small initialization leads to vanishing gradients. Thus, a good initialization can prevent the gradients of the neural network's activations from vanishing or exploding. In certain embodiments, the initialization is performed using Glorot initialization (also called Xavier initialization), where the disclosure initializes each weight following a Gaussian distribution. In certain embodiments, for simplicity, the client-k does not include the teacher model—student model structure, and the initialization of the deep neural networks is performed randomly.

Figure 3:
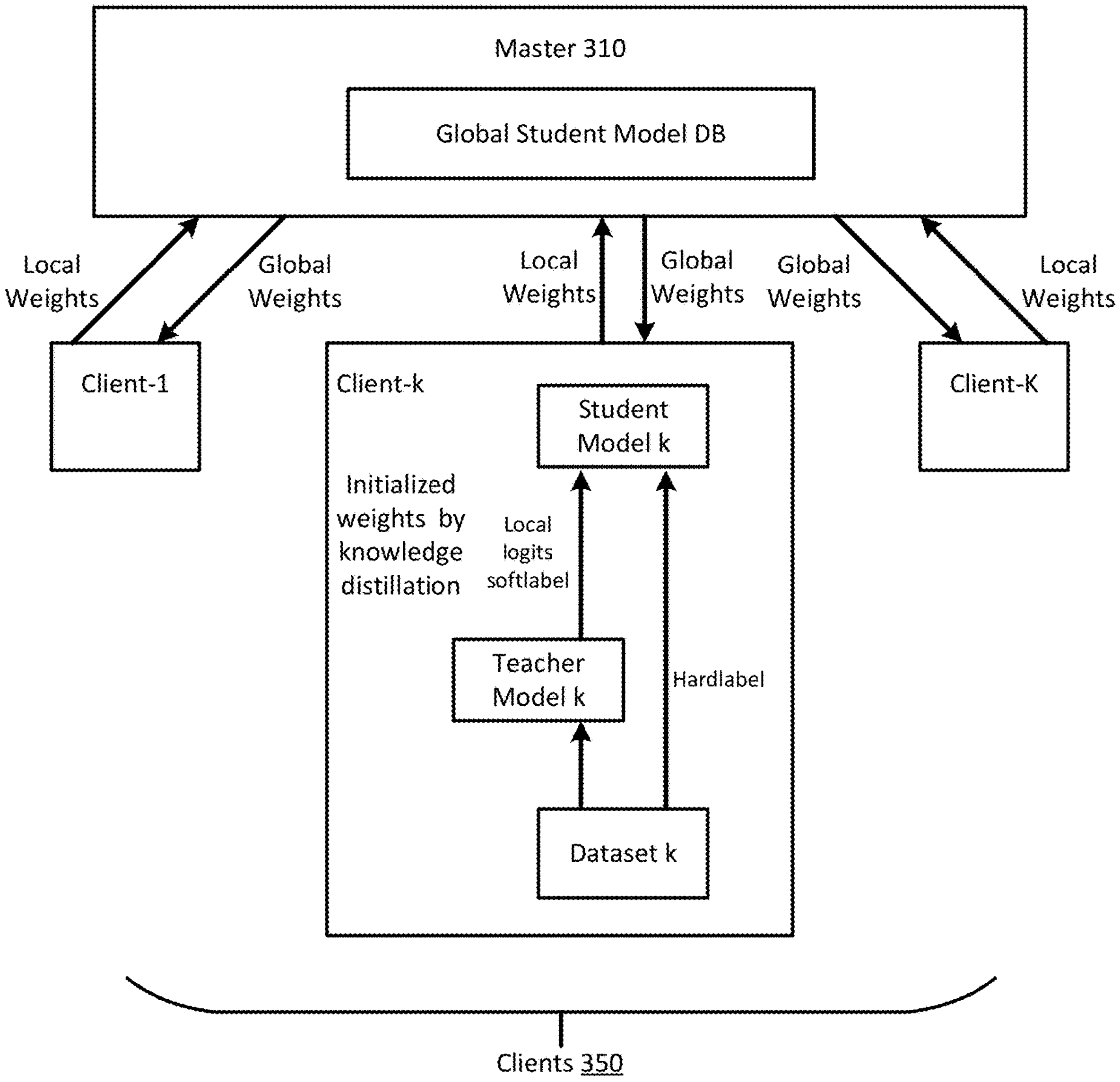
FIG. 3 schematically depicts a framework using asynchronous aggregation algorithm for multi-institutional collaboratively modelling according to certain embodiments of the disclosure.

In certain embodiments, when the model is very large, such as a BERT model, the disclosure initializes a student local model parameter by using a knowledge distillation method extracted from a well pre-trained teacher model. The master (server) will use the student model for iteratively aggregation. FIG. 3 shows a framework using the asynchronous aggregation algorithm for multi-institutional collaboratively modelling, and using knowledge distillation to initialize a student local model according to certain embodiments of the present disclosure. As shown in FIG. 3, the master 310 has a global student model DB, which include T number of versions of the global student model. Each of the clients 350, such as the client-k has a dataset-k, a teacher model-k, and a student model-k. The trained teacher model-k can be transferred to the student model-k. The transfer from the teacher model-k to the student model-k is performed during initialization, and after initialization, the student model-k and the dataset-k can then be used for the later coordination with the global student model DB. In certain embodiments, the knowledge distillation is performed according to Hinton, et al. (Geoffrey Hinton, Oriol Vinyals, and Jeff Dean, Distilling the knowledge in a neural network, arXiv: 1503.02531, 2015), which is incorporated herein by reference in its entirety.

After the training of the local model in the client-k is launched, and the local model (student model-k) is called again in the second or a later round, the local model is configured to perform a new iteration of training using the received (current) global weight. In certain embodiments, the local model in the client-k defines the received global model weight $W_t$ as the current local model weight $W_{t,k,ts}$, and use the dataset-k to update the local model weight $W_{t,k,ts}$ by:

for each local epoch i∈E:

for each batch b∈B:

$$W_{t+1,k,ts}=W_{t,k,ts}-\eta*\nabla L(w,b) \quad (6).$$

Here i is the number of local epochs, E is a hyper parameter indicating the total number of local epochs for each iteration or each round of training of the local model, and E is a positive integer. b is the number of batches of training data, B is a hyperparameter indicating the total number of batches of training data from the dataset k, and B is a positive integer. $\eta$ is the learning rate (hyper-parameter) of the local model, $\nabla L(w, b)$ is the loss function using the current local weight and the batch of training data, and $W_{t+1,k,ts}$ is the local weight after the t-th round of training. In certain embodiments, the training of the local model is performed using SGD. After training of the local model, the local model of the client-k is further configured to return the training result to the client management thread. In certain embodiments, the training result includes t+1, ts, $n^k$, $p_{t+1,k}$, and $W_{t+1,k,ts}$.

The others of the clients 250 may have the same teacher-student module structure as the client-k, but their datasets would be different from each other.

In certain embodiments, the asynchronous federated learning application 218 may further include a user interface and/or a scheduler. The user interface may be used for configuring parameters of the application, and for training the global and local models. The scheduler may be used to schedule the operations and the data flow between the modules of the application, and between the master and the clients. In certain embodiments, the asynchronous federated learning application 218 may also be stored in one of the clients, and the client works both as the master to coordinate training of the global model and as the client to train the local model.

FIG. 4 schematically depicts an algorithm that operates in a master according to certain embodiments of the present disclosure, and FIG. 5 schematically depicts an algorithm that operates in a client according to certain embodiments of the present disclosure. In certain embodiments, the mater is the master 210 shown in FIG. 2, and the client is anyone of the clients 250 shown in FIG. 2. The algorithm illustrates the details of the totally asynchronous aggregation. As shown in FIG. 4, this algorithm defines two types of events for asynchronous aggregation: aggregation event $E_{aggr}$ and local-model train management events $E_k$. Once the aggregation thread in the sever received an $E_k$, which means a local model from client k is ready, the server can immediately update the global model. Once a training management thread in the sever received the event $E_{aggr}$, which means the global model is updated using a local model from the client k, the server can immediately notify the client k for next training iteration using the new weights of global model. Through these two types of events, the algorithm can reduce the idle time in each institution due to synchronization waiting in the related synchronization-based aggregation algorithm.

In contrast, for the asynchronous algorithm in device federated learning environments, the training of each institution is triggered periodically by a management thread on the sever, there exists lots of idle time to wait for the periodical scheduling. In institutional federated learning environments, the number of institutions is small, the disclosure designs that the server can maintain a client management thread pool, a thread in the pool manages the training of an institution, which is more efficient than only using a thread managing multi-devices in device federated learning environments, and further squeezes the idle time during the scheduling process. Thus, the asynchronous algorithms shown in FIGS. 4 and 5 are totally asynchronous, which can squeeze all the idle time in each institution, no idle time exists in any institution.

FIG. 6 schematically depicts update sequence of the models according to certain embodiments of the present disclosure. The components shown in FIG. 6 come from FIG. 3, and the data flow shown in FIG. 6 comes from FIGS. 4 and 5. As shown in FIG. 6, the global student model database include T versions of student models corresponding to T global epochs. The disclosure trains each student model stored in the corresponding client T times, and the T times of local model training results in each client are used to update the T student models in the master, respectively. In one aspect, the client student model trainings are performed in parallel and independently, and are controlled by the K client management threads. In another aspect, each student model in the master is updated once upon receiving training result from one client student model, and thus the weight of the student model in the master is affected by each of the client student models. As an example, the student model k is trained for T epochs. After the t-th epoch of training of the student model k, the training result will be used to update the student model epoch-tin the master. Accordingly, each of the student model 1 to K will be trained t times, and each of the student model epoch-1 to the student model epoch-Tin the master will be updated K times.

Figure 7:
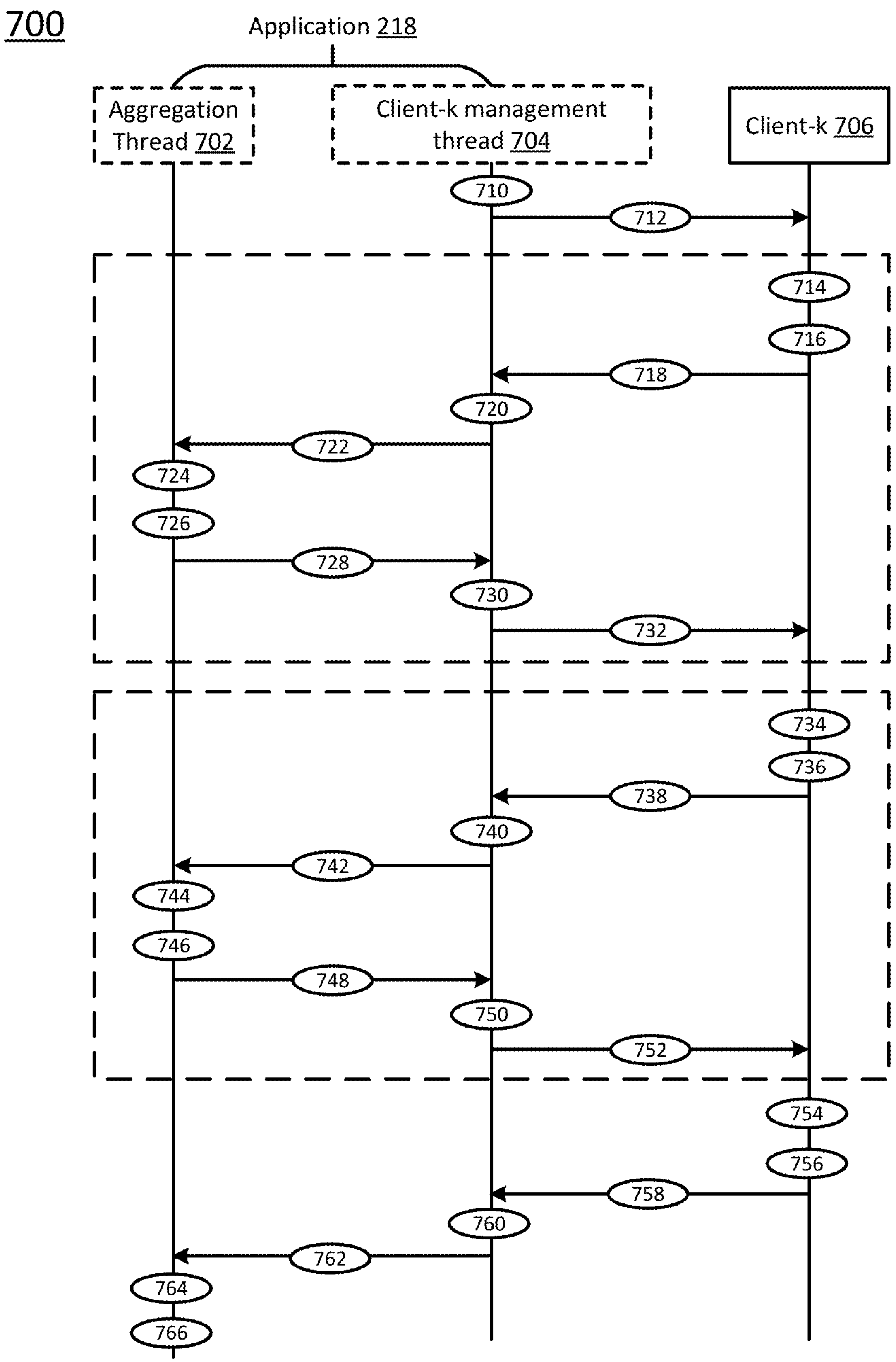
FIG. 7 schematically depicts a method for training an asynchronous federated learning model according to certain embodiments of the present disclosure.

FIG. 7 schematically depicts a method for training an asynchronous federated learning model according to certain embodiments of the present disclosure. In certain embodiments, the training process corresponds to Algorithms 1 and 2 shown in FIGS. 4 and 5. In certain embodiments, the method may be implemented on a system shown in FIG. 2. It should be particularly noted that, unless otherwise stated in the present disclosure, the steps of the method may be arranged in a different sequential order, and are thus not limited to the sequential order as shown in FIG. 7.

As shown in FIG. 7, when the asynchronous federated learning application 218 is initialized, it defines the aggregation event $E_{aggr}$ and the training event $E_k$, and runs an aggregation thread 702 and K number of client management threads, where only the client-k management thread 704 is shown for simplicity. The client-k would run its local model training upon a call by the client-k management thread 704. In certain embodiments, the asynchronous federated learning application 218 also defines the iteration or round of training for the clients, e.g., the global epoch number T.

At procedure 710, the client-k management thread 704 is executed, it starts the first iteration of training the client-k by defining parameters of a function ClientUpdate(k, t, $W_t$), where k is the corresponding client number, t is the global epoch, and $W_t$ is the global model parameter or global model weight in the t epoch of the client-k. Because it is the client-k manage thread 704, the client number is k; because it is the first iteration of training the client-k, t is 1; and because it is the beginning of the training of the models, there is no global weight, and the global model weight is indicated as "None." Therefore, the client-k management thread 704 defines the function as ClientUpdate(k, 1, None). Kindly note that the initialization of the trainings of the local models may start at substantially the same time. In other words, the functions ClientUpdate(1, 1, None), ClientUpdate(2, 1, None), . . . , ClientUpdate(k, 1, None), and ClientUpdate(K, 1, None) are defined or prepared substantially at the same time.

At procedure 712, after defining the function, the client-k management thread 704 sends the function ClientUpdate(k, 1, None) to the client-k, or in other words, calls the client-k to execution the function ClientUpdate(k, 1, None). Since the initialization of the training of the local models is almost at the same time, the K client management threads actually send the functions ClientUpdate(1, 1, None) to ClientUpdate (K, 1, None) to their respective K clients almost at the same time.

At procedure 714, upon receiving the function ClientUpdate(k, 1, None), the client-k determines that it is the first training iteration because t is 1 and/or $W_1$ is "None," the client-k initializes the parameters $W_{t,k,ts}$, where t is the iteration number, k is the client number, and ts is the client report timestamp. Because it is the first iteration and the timestamp is 0, the initialized parameter $W_{t,k,ts}$ will be $W_{1,k,0}$. In certain embodiments, the initialization of the $W_{1,k,0}$ is performed randomly. In certain embodiments, the initialization of the $W_{1,k,0}$ is performed using knowledge distillation.

At procedure 716, after initializing the parameter $W_{1,k,0}$, the client-k trains the local model using the parameter $W_{1,k,0}$. In certain embodiments, the training of the local model is performed for E number of rounds or E number of local epochs. In certain embodiments, in each local epoch, the client-k trains the model using each of the B batches of dataset-k. That is, the local model will be updated B times during each local epoch. After each of the E local epochs of training is performed, the local parameter $W_{1,k,0}$ is updated to $W_{2,k,ts}$, where ts is the timestamp after the first iteration of training of the local model.

At procedure 718, the client-k returns (t+1, ts, $n^k$, $p_{t+1,k}$, $W_{t+1,k,ts}$) to the ClientUpdate function in the client-k management thread 704, where the value of the above parameters are (2, ts, $n^k$, $p_{2,k}$, $W_{2,k,ts}$). Kindly note the global iteration count t is now increased from 1 to 2.

At procedure 720, upon receiving the parameters from the client-k, the client-k management thread 704 prepares a training event $E_k$ which includes all the received parameters.

At procedure 722, after preparing the training event $E_k$, the client-k management thread 704 sends $E_k$ to the aggregation thread 702.

At procedure 724, upon receiving the training event $E_k$, the aggregation thread 702 calculates a staleness weight value using the equation (1): $\alpha_t=f(t, ts, \alpha)$. Referring back to the procedure 718, the t here is 2, the ts is the timestamp at the end of the first iteration of training the local model in the client-k, and a is the staleness weight value-a predefined hyperparameter.

At procedure 726, after calculating the staleness weight $\alpha_2$, the aggregation thread 702 then updates the global model using the equation (5):

$$W_t = (1-\alpha_t)*W_{t-1}+\alpha_t*\sum_{k=1}^{K}\left(\frac{n^k}{n}*p_{t,k}*W_{t,k,ts}\right),$$

where t is 2; $W_{t-1}$ is the current global model weight, which could be an initialization value or a randomized value if it is the first time the global model is updated; $n^k$ is the data size of the dataset-k; n is the total data size in all the K clients; $p_{t,k}$ is $p_{2,k}$ which is the accuracy of the local model in client-k for the first iteration of the training; and $W_{t,k,ts}$ or here $W_{2,k,ts}$ is the local model weight of the local model in the client-k after the first iteration of the training. Accordingly, the global model weight $W_t$ or here $W_2$ is obtained. Kindly note that the global model weight $W_t$ or here $W_2$ indicates the current model weight, and if later on another client finishes its first iteration of training and the corresponding training event is provided, the aggregation thread will regard the current model weight as the $W_{t-1}$ and update the global model again using the equation (5). Kindly note that the global model updated in this step is one version of the global model, that is, the student model epoch-1 shown in FIG. 6.

At procedure 728, the aggregation thread 702 prepares the aggregation event $E_{aggr}$ based on the global model weight $W_2$, and sends the aggregation event $E_{aggr}$ to the client-k management thread 704.

At procedure 730, upon receiving the aggregation event $E_{aggr}$, the client-k management thread 704 prepares the function ClientUpdate, and here the ClientUpdate(k, t, $W_t$) is actually ClientUpdate(k, 2, $W_2$).

At procedure 732, the client-k management thread 704 sends the current function ClientUpdate(k, t, $W_t$) to the client-k or calls the client-k to execute the function ClientUpdate(k, t, $W_t$).

At procedure 734, upon receiving the function ClientUpdate(k, t, $W_t$) from the client-k management thread 704, the client-k uses the weight $W_t$ as the local model weight, and performs the second iteration of the local model training using the local model weight. In other words, the local model weight is not a random or knowledge distilled weight as in the first iteration of training, but the current global model weight.

The procedures 736-752 are basically the same as the procedures 716-732, which finishes the second iteration of the local model training for client-k, and uses the updated local model parameters to update the global model. The global model updated in this step is one version of the global model, that is, the student model epoch-2 shown in FIG. 6.

The above procedures 734-752 are repeated until the T iterations of local model training for client-k have been finished. Specifically, the procedures 754-766 are basically the same as the procedures 734 to 746. The T iterations of local model training are finished at procedure 754 and 756, and the local model training result is used to update the global model at the procedure 766. The global model updated in this step is one version of the global model, that is, the student model epoch-T shown in FIG. 6.

Kindly note that the global weight at the procedure 766 may not be the final global model weight. Actually, the global weigh is obtained until each of the K clients has finished its procedure 766. Until now, the global model is well trained. The weight of the well-trained global model can then be transferred to all the K local models, so that the K clients can use the finalized weight to complete their local models, and use the completed local models to make their predictions or other applications.

Figure 8:
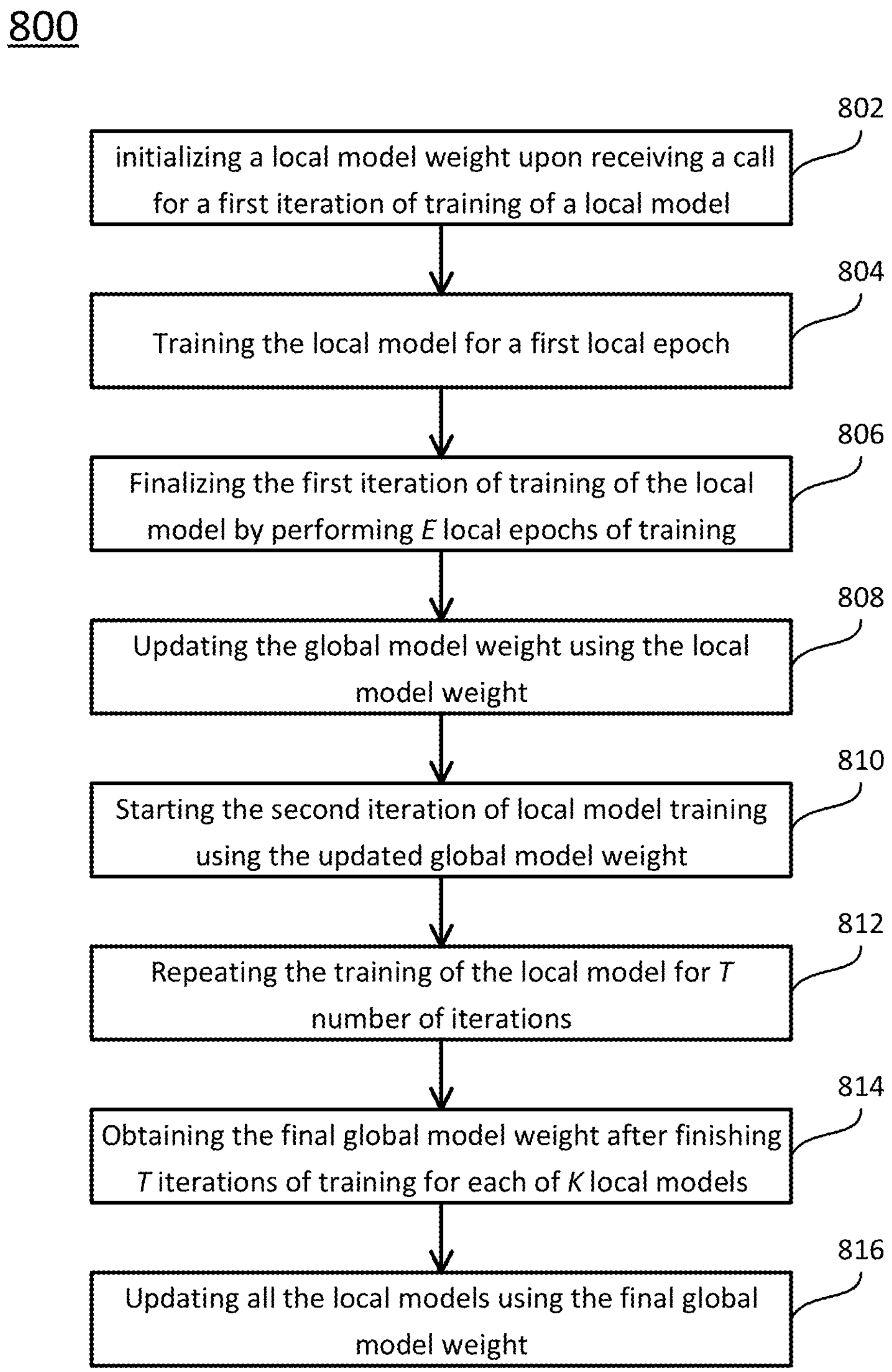
FIG. 8 schematically depicts a method for training a local federated learning model according to certain embodiments of the present disclosure.

FIG. 8 schematically depicts a method for training a local federated learning model according to certain embodiments of the present disclosure. In certain embodiments, the training process corresponds to Algorithm 2 shown in FIG. 5. In certain embodiments, the method may be implemented by any of the K clients shown in FIG. 2. It should be particularly noted that, unless otherwise stated in the present disclosure, the steps of the method may be arranged in a different sequential order, and are thus not limited to the sequential order as shown in FIG. 8.

At procedure 802, upon receiving a call for a ClientUpdate indicating that it is the first iteration of the local model training, the model-k initializes local model parameters. Specifically, now the parameter for the function ClientUpdate is k, 1, None, and the initialization is performed by knowledge distillation or by a random method. After initialization, the local model weight is $W_{1,\ k,\ 0}$, where "1" indicates that it is the first iteration of the local model training, "k" indicates the number of the client, and "0" indicates that it is the beginning of the first iteration of the local model training.

At procedure 804, the client-k trains the local model for a first local epoch, and trains the local model using B number of batches of data. For each batch b of the B number of batches, the client-k updates the local model weight using the equation (6). After B number of training cycles, the client-k finishes the first local epoch of training.

At procedure 806, the client-k trains the local model repeatedly from a second local epoch until the E-th local epoch, so as to finish the first iteration of training of the local model. The local model weight is added by one, so that the $W_{1,\ k,\ 0}$ is updated to $W_{2,\ k,\ ts}$, where "2" indicates that the first iteration of the local model training is finished, "k" indicates the number of the client, and "ts" indicates the timestamp at the end of the first iteration of training of the local model in the client-k.

At procedure 808, the client-k sends the current local model weight $W_{2,\ k,\ ts}$, the iteration number "2" indicating the finish of the first iteration, the timestamp ts, the data size $n^k$ in the client-k, and the accuracy of the local model $p_{t+1}$ or here $p_2$ indicating model accuracy for the first iteration of training, to the client-k management thread to prepare the training event $E_k$, and then the client-k management thread sends the $E_k$ to the aggregation thread of the global model to update the weight of the global model to obtain the updated global model weight.

At procedure 810, after aggregation, the aggregation thread sends the updated global weight to the client-k management thread, and the client-k management thread calls the client-k for the second iteration of local model training.

At procedure 812, upon receiving the call of ClientUpdate indicating that it is the second iteration of the local model training, the model-k uses the updated global model weight as the local model weight, and repeats the procedures 804-806 to train the local model, and repeats the procedure 808 to use the updated local model weight to further updates the global model weight. The training of the local model is repeated for T iterations.

At procedure 814, after T iterations of training of the local model in the client-k, the local model weight is sent to the global model to update the global model weight. When all the K clients have finished their T iterations of local model training, the then updated global model weight is the final model weight. In other words, the training of the K local models is asynchronous, and thus the time needed for the T iterations training of the local models are different. The training of the models is completed only when each of the K clients has finished its T iteration of training.

Referring back to FIG. 7, when all the T iterations of training for each of the K clients have been finished, the global model weight at the procedure 766 would be the final model weight. At this time, the aggregation thread in the master 210 would send the final weight to all the K clients as the weight of the K local models.

In certain aspects, the present disclosure relates to a method of using the well-trained local models to predict result for an instance.

In certain aspects, the present disclosure relates to a non-transitory computer readable medium storing computer executable code. In certain embodiments, the computer executable code may be the software stored in the storage device 216 as described above. The computer executable code, when being executed, may perform one of the methods described above.

Certain embodiments of the present disclosure, among other things, have the following advantages. (1) After each iteration of training of a local model, the training result will be used directly to update the global model, and the updated global model weight is then sent back to the local model for the next iteration of training. Therefore, there is no gap between iterations of local model training for each client. The process is completely asynchronous, and the training efficiency of the local models is ensured. Specifically, the whole training process is sped up significantly. (2) To accurately evaluate the contribution of the local model weight to the global model weight, and specifically to improve training convergence of the global model, the present disclosure considers three aspects: data size of the local models, staleness discount rates of the local models, and accuracy of the local model trainings. By incorporating all the three aspects in updating the global weight, the accuracy and convergency of the global weight is ensured.

(3) The local models are initialized by knowledge distillation, which further reduces the computing resource needed, and improves performance of the related computing devices.

The methods of the present disclosure are suitable for being applied in multi-institutional collaboratively modelling, where the number of training participations is small, and every client cannot be ignored, otherwise, it is meaningless to collaboratively build a model. Although the training environment is stable in the multi-institutional setting, the model can be extreme large, it is even hard to synchronize. Certain synchronization methods can reduce the impact of device clients' dropping and unstableness, but cannot be directly applied in multi-institutional setting, the big gap of training local models makes the synchronization even more difficult during the training process in multi-institutional setting, leading to longer synchronization waiting time for aggregating model in multi-institutional setting, slowing down the training process. By the totally asynchronous design and considering three different aspects, certain embodiments of the present disclosure target well the multi-institutional federated learning scenario.

In summary, the present disclosure provides an asynchronous multi-aspect weighted federated learning algorithm for effectively and efficiently accelerating multi-institutional collaboratively modelling. More specifically, the disclosure has (1) a totally asynchronous algorithm to reduce synchronization waiting latency and squeeze all the idle time; and (2) a multi-aspect weighted aggregation method to mitigate the error of aggregating global model and speed-up model convergence.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a master computing device for a federated learning, wherein the master computing device comprises a processor and a storage device storing computer executable code, and the computer executable code, when executed at the processor, is configured to:

execute a k-th client management thread of K client management threads by:

during initialization, instructing, directly by the k-th client management thread without external scheduling triggering, a k-th client computing device to initiate a first iteration of training of a k-th client federated learning model to obtain a training event Ek;

upon receiving an aggregation event $E_{aggr}$ from an aggregation thread, instructing the k-th client computing device to perform a t-th iteration of training of the k-th client federated learning model using the aggregation event $E_{aggr}$ to obtain the training event $E_k$; and sending the training event $E_k$ to the aggregation thread; and execute the aggregation thread by:

upon receiving the training event $E_k$ from the k-th client management thread, updating a global federated learning model in the master computing device to obtain the aggregation event $E_{aggr}$; and sending the aggregation event Lager back to the k-th client management thread, and triggering the k-th client management thread to start a next iteration of training of the k-th client federated learning model.

2. The system of claim 1, wherein the training event $E_k$ comprises a client number k, a global epoch number t, a client report timestamp ts, a dataset size $n^k$ for training the k-th client federated learning model, an accuracy $p_{t,k}$ for the t-th iteration of training of the k-th client federated learning model, and a local model weight of the k-th client federated learning model $W_{t,k,ts}$ after the t-th iteration of training; and wherein $k \in K$, K is a positive integer indicating a total number of client computing devices, $t \in T$, and T is a positive integer indicating a total iteration of epochs for training each client federated learning model stored in corresponding one of the K client computing devices.

3. The system of claim 2, wherein the step of updating the global federated learning model to obtain the aggregation event $E_{aggr}$ is performed using a equation of:

$$W_t = (1-\alpha_t) * W_{t-1} + \alpha_t * \sum_{k=1}^{K} \left( \frac{n^k}{n} * p_{t,k} * W_{t,k,ts} \right),$$

wherein $W_t$ is updated weight of the global federated learning model after incorporating parameters from the received training event $E_k$, $W_{t-1}$ is weight of the global federated learning model before incorporating the parameters of the received training event $E_k$, n is summated training dataset size from all the K clients, $\alpha_t$ is staleness discount rate of the t-th iteration of training of the k-th client federated learning model, and $p_{t,k}$ is accuracy of the t-th iteration of training of the k-th client federated learning model.

4. The system of claim 3, wherein the staleness discount rate $\alpha_t$ is a function of t, ts, and α, t indicates an earliest time that one of the K federated learning model finishes the t-th iteration of training, and α is a hyperparameter indicating a staleness weight value.

5. The system of claim 4, wherein the staleness discount rate $\alpha_t$ is calculated using at least one of a linear function, a polynomial function, and an exponential function.

6. The system of claim 1, wherein each of the K client federated learning models is initialized by knowledge distillation.

7. The system of claim 1, wherein each of the K client federated learning model is initialized randomly.

8. The system of claim 1, wherein each of the K number of client federated learning models is trained using stochastic gradient descent (SGD).

9. The system of claim 1, wherein the federated learning is an institutional federated learning.

10. The system of claim 1, wherein the global federated learning model comprises T number of global federated learning model versions, and the k-th client federated learning model is configured to, after each iteration of trainings, update corresponding one of the T number of global federated learning model versions.

11. A method for federated learning, comprising:

executing, by a master computing device, K client management threads, wherein a k-th client management thread of the K client management threads is performed by:

during initialization, instructing, directly by the k-th client management thread without external scheduling triggering, a k-th client computing device to initiate a first iteration of training of a k-th client federated learning model to obtain a training event $E_k$;

upon receiving an aggregation event $E_{aggr}$ from an aggregation thread, instructing the k-th client computing device to perform a t-th iteration of training of the k-th client federated learning model using the aggregation event $E_{aggr}$ to obtain the training event $E_k$; and sending the training event $E_k$ to the aggregation thread; and executing, by the master computing device, the aggregation thread, wherein the aggregation thread is performed by:

upon receiving the training event $E_k$ from the k-th client management thread, updating a global federated learning model in the master computing device to obtain the aggregation event $E_{aggr}$; and sending the aggregation event $E_{aggr}$ back to the k-th client management thread, and triggering the k-th client management thread to start a next iteration of training of the k-th client federated learning model.

12. The method of claim 11, wherein the training event $E_k$ comprises a client number k, a global epoch number t, a client report timestamp ts, a dataset size $n^k$ for training the k-th client federated learning model, an accuracy $p_{t,k}$ for the t-th iteration of training of the k-th client federated learning model, and a local model weight of the k-th client federated learning model $W_{t,k,ts}$ after the t-th iteration of training; and wherein $k \in K$, K is a positive integer indicating a total number of client computing devices, $t \in T$, and T is a positive integer indicating a total iteration of epochs for training each client federated learning model stored in corresponding one of the K client computing devices.

13. The method of claim 12, wherein the step of updating the global federated learning model to obtain the aggregation event $E_{aggr}$ is performed using a equation of:

$$W_t = (1-\alpha_t) * W_{t-1} + \alpha_t * \sum_{k=1}^{K}\left(\frac{n^k}{n} * p_{t,k} * W_{t,k,ts}\right),$$

wherein $W_t$ is updated weight of the global federated learning model after incorporating parameters from the received training event $E_k$, $W_{t-1}$ is weight of the global federated learning model before incorporating the parameters of the received training event $E_k$, n is summated training dataset size from all the K clients, $\alpha_t$ is staleness discount rate of the t-th iteration of training of the k-th client federated learning model, and $p_{t,k}$ is accuracy of the t-th iteration of training of the k-th client federated learning model.

14. The method of claim 13, wherein the staleness discount rate $\alpha_t$ is a function of t, ts, and $\alpha$, t indicates an earliest time that one of the K federated learning model finishes the t-th iteration of training, $\alpha$ is a hyperparameter indicating a staleness weight value, wherein the staleness discount rate $\alpha_t$ is calculated using at least one of a linear function, a polynomial function, and an exponential function.

15. The method of claim 11, wherein each of the K client federated learning models is initialized by knowledge distillation.

16. The method of claim 11, wherein the federated learning is an institutional federated learning.

17. A non-transitory computer readable medium storing computer executable code, wherein the computer executable code, when executed at a processor of an active computing device, is configured to:

execute a k-th client management thread of K client management threads by:

during initialization, instructing, directly by the k-th client management thread without external scheduling triggering, a k-th client computing device to initiate a first iteration of training of a k-th client federated learning model to obtain a training event $E_k$;

upon receiving an aggregation event $E_{aggr}$ from an aggregation thread, instructing the k-th client computing device to perform a t-th iteration of training of the k-th client federated learning model using the aggregation event $E_{aggr}$ to obtain the training event $E_k$; and sending the training event $E_k$ to the aggregation thread; and execute the aggregation thread by:

upon receiving the training event $E_k$ from the k-th client management thread, updating a global federated learning model in the master computing device to obtain the aggregation event $E_{aggr}$, and sending the aggregation event $E_{aggr}$ back to the k-th client management thread, and triggering the k-th client management thread to start a next iteration of training of the k-th client federated learning model.

18. The non-transitory computer readable medium of claim 17, wherein the training event $E_k$ comprises a client number k, a global epoch number t, a client report timestamp ts, a dataset size $n^k$ for training the k-th client federated learning model, an accuracy $p_{t,k}$ for the t-th iteration of training of the k-th client federated learning model, and a local model weight of the k-th client federated learning model $W_{t,k,ts}$ after the t-th iteration of training; and wherein $k \in K$, K is a positive integer indicating a total number of client computing devices, $t \in T$, and T is a positive integer indicating a total iteration of epochs for training each client federated learning model stored in corresponding one of the K client computing devices.

19. The non-transitory computer readable medium of claim 18, wherein the step of updating the global federated learning model to obtain the aggregation event $E_{aggr}$ is performed using a equation of:

$$W_t = (1-\alpha_t) * W_{t-1} + \alpha_t * \sum_{k=1}^{K}\left(\frac{n^k}{n} * p_{t,k} * W_{t,k,ts}\right),$$

wherein $W_t$ is updated weight of the global federated learning model after incorporating parameters from the received training event $E_k$, $W_{t-1}$ is weight of the global federated learning model before incorporating the parameters of the received training event $E_k$, n is summated training dataset size from all the K clients, $\alpha_t$ is staleness discount rate of the t-th iteration of training of the k-th client federated learning model, and $p_{t,k}$ is accuracy of the t-th iteration of training of the k-th client federated learning model.

20. The non-transitory computer readable medium of claim 19, wherein the staleness discount rate $\alpha_t$ is a function of t, ts, and $\alpha$, t indicates an earliest time that one of the K federated learning model finishes the t-th iteration of training, and $\alpha$ is a hyperparameter indicating a staleness weight value.

* * * * *